United States Patent
Gu

(10) Patent No.: US 12,422,939 B2
(45) Date of Patent: Sep. 23, 2025

(54) POWER SUPPLY DETACHABLE MOUSE

(71) Applicant: Shenzhen Xinshuntian Technology Co., Ltd, Guangdong (CN)

(72) Inventor: Wubin Gu, Guangdong (CN)

(73) Assignee: Shenzhen Xinshuntian Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/826,222

(22) Filed: Sep. 6, 2024

(65) Prior Publication Data

US 2025/0093975 A1    Mar. 20, 2025

(30) Foreign Application Priority Data

Sep. 15, 2023  (CN) .......................... 202322511571.9

(51) Int. Cl.
| | | |
|---|---|---|
| *G06F 3/0354* | (2013.01) | |
| *H01M 10/46* | (2006.01) | |
| *H01M 50/247* | (2021.01) | |
| *H02J 7/00* | (2006.01) | |

(52) U.S. Cl.
CPC ........ *G06F 3/03543* (2013.01); *H01M 10/46* (2013.01); *H01M 50/247* (2021.01); *H01M 2220/30* (2013.01); *H02J 7/0045* (2013.01)

(58) Field of Classification Search
CPC . G06F 3/03543; H01M 50/247; H01M 10/46; H01M 2220/30; H02J 7/0045
See application file for complete search history.

(56) References Cited

U.S. PATENT DOCUMENTS

| | | | | |
|---|---|---|---|---|
| 2005/0083302 A1* | 4/2005 | Chen | ................... | G06F 3/03543 345/163 |
| 2013/0063353 A1* | 3/2013 | Liu | ..................... | G06F 3/03543 345/163 |
| 2014/0210720 A1* | 7/2014 | Chang | ................. | G06F 3/03543 345/166 |

FOREIGN PATENT DOCUMENTS

CN            214253168 U       9/2021

* cited by examiner

*Primary Examiner* — Hang Lin

(57) ABSTRACT

The application falls within the field of mouse, and particularly relates to a power supply detachable mouse, including a mouse body and a battery assembly for supplying power to the mouse body, wherein a mounting groove is provided on the lower side of the mouse body, a first connection end is provided in the mounting groove, a second connection end is provided on the battery assembly, and a charging socket for charging the battery assembly is provided on the battery assembly, the battery assembly is detachably clamped in the mounting groove, and the second connection end is electrically connected to the first connection end. In the application, since the battery assembly is detachably clamped in the mounting groove, the connection between the battery assembly and the mounting groove is more stable while being able to be disassembled, so that the mouse is more reliable when being used.

12 Claims, 6 Drawing Sheets

POWER SUPPLY DETACHABLE MOUSE

CROSS REFERENCE TO RELATED APPLICATIONS

The present application claims the benefit of Chinese Patent Application No. 202322511571.9 filed on Sep. 15, 2023, the contents of which are incorporated herein by reference in their entirety.

TECHNICAL FIELD

The application falls within the field of mouse, and particularly relates to a mouse structure.

BACKGROUND ART

Mouse is an external input device of a computer, and is also an indicator for the vertical and horizontal coordinate positioning of a computer display system. The use of a mouse makes the operation of a computer easier and faster. For the existing mouse, there are a wireless mouse and a wired mouse, wherein the wireless mouse is powered by a built-in battery.

With regard to an existing wireless mouse, a disposable battery is usually used for power supply, and after the battery power is consumed, the wireless mouse can continue to be used by directly replacing a new disposable battery; however, the use of such a wireless mouse is not only costly, but also troublesome to dispose of the disposable battery that runs out of power and is not environmentally friendly.

In order to solve the above problems of the prior art, the prior patent discloses a mouse (Application Number CN202120176663.4), including: a mouse body and two battery assemblies, wherein the mouse body comprises a housing, the bottom of the housing is provided with a groove, and the inner wall of the groove is provided with a first electrical connection part and a first magnetic connector; at the same time, one of the battery modules is detachably fitted with the groove so as to supply power to the mouse body via the battery assembly, and the battery assembly comprises a box body, a battery accommodated in the box body, a circuit board accommodated in the box body, a second electrical connection part partially exposing the box body, a second magnetic connector provided outside the box body and a charging interface provided on the box body; when the battery assembly is fitted with the groove, the box body is accommodated in the groove, the first magnetic connector is magnetically connected to the second magnetic connector, and the first electrical connection part is in contact with the second electrical connection part to be electrically connected; when the battery assembly is separated from the recess, the charging interface of the battery assembly can be connected to an external power supply to charge the battery of the battery assembly.

The mouse of the prior patent enables the battery assembly to be recharged and used repeatedly through the fit of the battery assembly capable of being recharged and the mouse body, which is cheaper to use and more environmentally friendly than directly purchasing and replacing the disposable battery; however, in the prior patent, the connection between the battery assembly and the mouse body is through magnetic attraction, and the connection mode of magnetic attraction is relatively unstable; the battery assembly and the mouse body are easily disconnected, and the mouse needs to slide frequently during use; therefore, under long-term use of the mouse, the disconnection between the mouse body and the two battery assemblies easily occurs frequently, and the disconnection causes the mouse to be frequently disconnected from the power supply and cannot be used, so that the reliability of the mouse is relatively insufficient.

SUMMARY OF THE INVENTION

In order to solve the above-mentioned problems, an object of the application is to provide a power supply detachable mouse, wherein the mouse comprises a detachable battery assembly, and the battery assembly can be more stably mounted in the mouse, so that the mouse is more reliable in use.

In order to solve the above-mentioned problems, the technical solution of the application is as follows.

A power supply detachable mouse comprises a mouse body and a battery assembly for supplying power to the mouse body, wherein a mounting groove is provided on a lower side of the mouse body, a first connection end is provided in the mounting groove, a second connection end is provided on the battery assembly, and a charging socket for charging the battery assembly is provided on the battery assembly, characterized in that the battery assembly is detachably clamped in the mounting groove, and the second connection end is electrically connected to the first connection end.

In the mouse, the battery assembly is detachably provided in the mounting groove, and can be detached from the mouse body and charged via the charging socket when the battery is insufficient; after the charging is completed, the battery assembly is mounted into the mounting groove, at this time, the first connection end and the second connection end are connected, and the battery assembly supplies power to the mouse body, so that the mouse body can be normally used; however, since the battery assembly is detachably clamped into the mounting groove, the connection between the battery assembly and the mounting groove is more stable than the magnetic connection when the battery assembly and the mounting groove can be disassembled so that the mouse is more reliable in use.

Further, the battery assembly is more than two. More than two battery assemblies can be used alternatively to keep the mouse body powered at all times.

Further, the first connection end includes a plurality of spring probes, the second connection end includes a plurality of contacts, and the plurality of contacts respectively abut the plurality of spring probes. The fit of the spring probes and the contacts allows the battery assembly to be more stably powered when the battery assembly is mounted on the mouse body.

Further, the plurality of spring probes are provided on the lower side of the mounting groove, the contacts are fixedly provided inside the battery assembly, and the lower side of the battery assembly is provided with a plurality of connection holes, the plurality of contacts are exposed to the outside through the plurality of connection holes, respectively, and the plurality of spring probes pass through the plurality of connection holes to abut the corresponding contacts, respectively.

Further, a first clamping part is provided on one side of the battery assembly, a first clamping groove is provided on one side of the mounting groove, and the first clamping part is detachably clamped with the first clamping groove.

Further, one side of the battery assembly is provided with a deformation groove, two ends of the first clamping part are respectively fixed to two sides of the deformation groove, and a deformation gap for deformation of the first clamping part is formed between the first clamping part and the deformation groove. When the first clamping part is clamped into the first clamping groove, deformation is performed through the deformation gap so as to be smoothly inserted into the first clamping groove for clamping; when the first clamping part is disengaged from the first clamping groove, the first clamping part is deformed by the deformation gap so as to be smoothly disengaged from the first clamping groove.

Further, a first avoiding groove for facilitating removal of the battery assembly is provided on a side surface of the first clamping part, a second avoiding groove for facilitating removal of the battery assembly is provided above one side of the mounting groove, and the first avoiding groove corresponds to the position of the second avoiding groove. The second avoiding groove is provided so that a user can align the bracket with the first avoiding groove, and the first avoiding groove is provided so that a user can apply an external force to the battery assembly via the bracket so as to control the first clamping part to disengage from the first clamping groove.

Further, a first clamping part is provided on one side of the mounting groove, a first clamping groove is provided on one side of the battery assembly, and the first clamping part is detachably clamped with the first clamping groove.

Further, a clamping piece is movably provided in the mouse body, a push-pull part is formed at the lower end of the clamping piece protruding from the lower side of the mouse body, a front end of the clamping piece protruding from one side of the mounting groove is formed at the first clamping part, and an elastic body is provided between the rear end of the clamping piece and the mouse body. Pushing the push-pull part to drive the clamping part, so that the first clamping part is retracted, and at this time, the battery assembly is smoothly mounted in the mounting groove; at this time, the push-pull part is released, and under the action of the elastic body, the clamping piece resets, driving the first clamping part to extend so as to be clamped in the first clamping groove, so as to realize the clamping connection between the first clamping part and the first clamping groove.

Further, an elastic ejection structure is provided in the mounting groove, and the lower side of the battery assembly abuts against the elastic ejection structure. Providing an elastic ejection structure, wherein the battery assembly is mounted in the mounting groove, the first clamping part is clamped in the clamping groove, and the battery assembly compresses the elastic ejection structure; when the pulling part is pushed to enable the first clamping part to retreat, the battery assembly is ejected out under the action of the elastic ejection structure.

Further, the lower side of the first clamping part is provided with a first guide slope, and one side of the mounting groove is provided with a second guide slope, wherein the second guide slope is located above the first clamping groove. The fit of the first guide slope and second guide slope facilitates insertion of the first clamping part.

Further, the other end of the battery assembly is provided with a second clamping part, the other side of the mounting groove is provided with a second clamping groove, and the second clamping part is detachably clamped into the second clamping groove. Specifically, when mounting the battery assembly, firstly mounting one side of the battery assembly in the mounting groove so as to clamp the second clamping part into the second clamping groove, and then mounting the other side of the battery assembly in the mounting groove so as to realize the clamping connection between the first clamping part and the first clamping groove; the arrangement, namely, positioning is performed through the fit of the second clamping groove and the second clamping part, so that the position when the first clamping part and the second clamping part are clamped is more convenient for alignment, and after the battery assembly is installed, the connection between the battery assembly and the mouse body is more stable.

Further, the battery assembly is square or rectangular or cylindrical in shape, and the mounting groove shape is adapted to the battery assembly shape.

The advantageous effects of the application are as follows: in the mouse, the battery assembly is detachably provided in the mounting groove, and can be detached from the mouse body and charged via the charging socket when the battery is insufficient; after the charging is completed, the battery assembly is mounted into the mounting groove, at this time, the first connection end and the second connection end are connected, and the battery assembly supplies power to the mouse body, so that the mouse body can be normally used; however, since the battery assembly is detachably clamped into the mounting groove, the connection between the battery assembly and the mounting groove is more stable when the battery assembly and the mounting groove can be disassembled so that the mouse is more reliable in use.

DETAILED DESCRIPTION OF THE INVENTION

Figure 1:
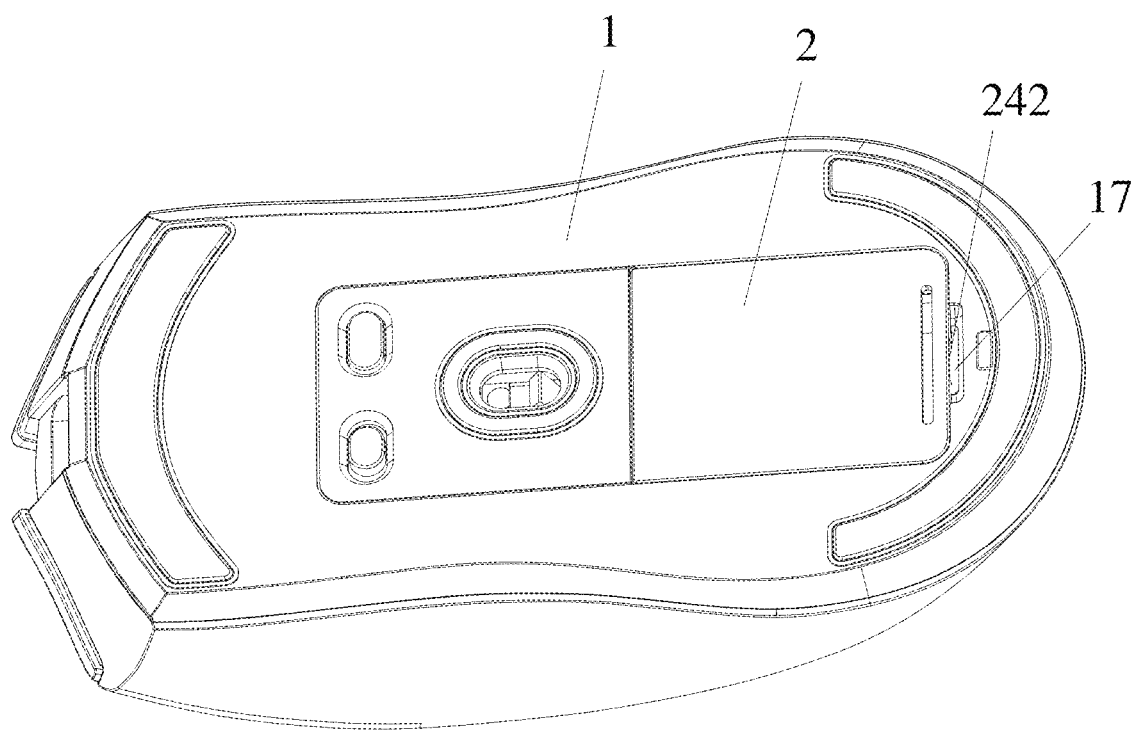
FIG. 1 is a schematic structural diagram of embodiment 1 of the application.

In order to make the objects, technical solutions and advantages of the application more clear, the application is described in further detail below with reference to the drawings and embodiments. It should be understood that the specific embodiments described herein are merely illustrative of the application and are not intended to limit the application.

See FIGS. 1-7, in a particular embodiment, there is provided a power supply detachable mouse, comprising a mouse body 1 and a battery assembly 2 for supplying power to the mouse body, wherein a mounting groove 11 is provided on the lower side of the mouse body 1, a first connection end 12 is provided in the mounting groove 11, a second connection end 21 is provided on the battery assembly 2, and a charging socket 22 for charging the battery assembly is provided on the battery assembly 2, the battery assembly 2 is detachably clamped in the mounting groove 11, and the second connection end 21 is electrically connected to the first connection end 12.

Specifically, in the mouse, the implementation structure and the principle of circuit design of the mouse body 1 are prior art, and the principle of circuit design inside the battery assembly 2 is prior art. And the charging socket 22 of the battery assembly is an existing electrical connection interface, and the principle of charging via the charging socket 22 is prior art, such as using USB-C interface.

In the embodiment, there are two or more battery assemblies 2.

In the embodiment, the first connection end 12 comprises a plurality of spring probes 121, the second connection end 21 comprises a plurality of contacts 211, and the plurality of contacts 211 respectively abut against the plurality of spring probes 121. Specifically, the first connection end 12 is a structure connected to a main board inside the mouse body 1, and the contact 211 is a structure connected to a battery main board 212 inside the battery assembly 2, wherein the battery 213 inside the battery assembly 2 is connected to the battery main board 212 so as to realize the fit between the spring probe 121 and the contact 211, and the battery assembly 2 supplies power to the mouse body 1. In addition, the charging socket 22 is connected to the battery main board 212 inside the battery assembly 2 so as to charge the battery 213 of the battery assembly 2 through the charging socket 22.

In the embodiment, a plurality of spring probes 121 are provided on the lower side of the mounting groove 11, a plurality of contacts 211 are fixedly provided inside the battery assembly 2, and the lower side of the battery assembly 2 is provided with a plurality of connection holes 23, the plurality of contacts 211 are exposed to the outside through the plurality of connection holes 23, respectively, and the plurality of spring probes 121 pass through the plurality of connection holes 23 to abut the corresponding contacts 211, respectively.

In the embodiment, the battery assembly 2 is square or rectangular or cylindrical in shape, and the shape of the mounting groove 11 is adapted to the shape of the battery assembly.

In the embodiment, one side of the battery assembly 2 is detachably clamped with one side of the mounting groove 11.

Specifically, the specific connection of the battery assembly with the mounting groove may include the following two embodiments.

Figure 2:
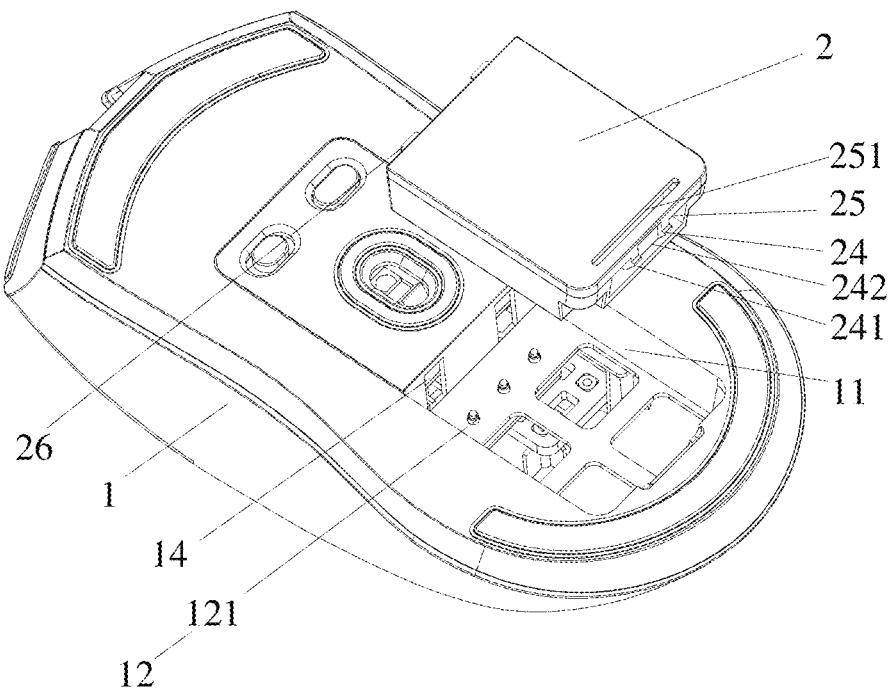
FIG. 2 is a first perspective exploded view of embodiment 1 of the application.
Figure 3:
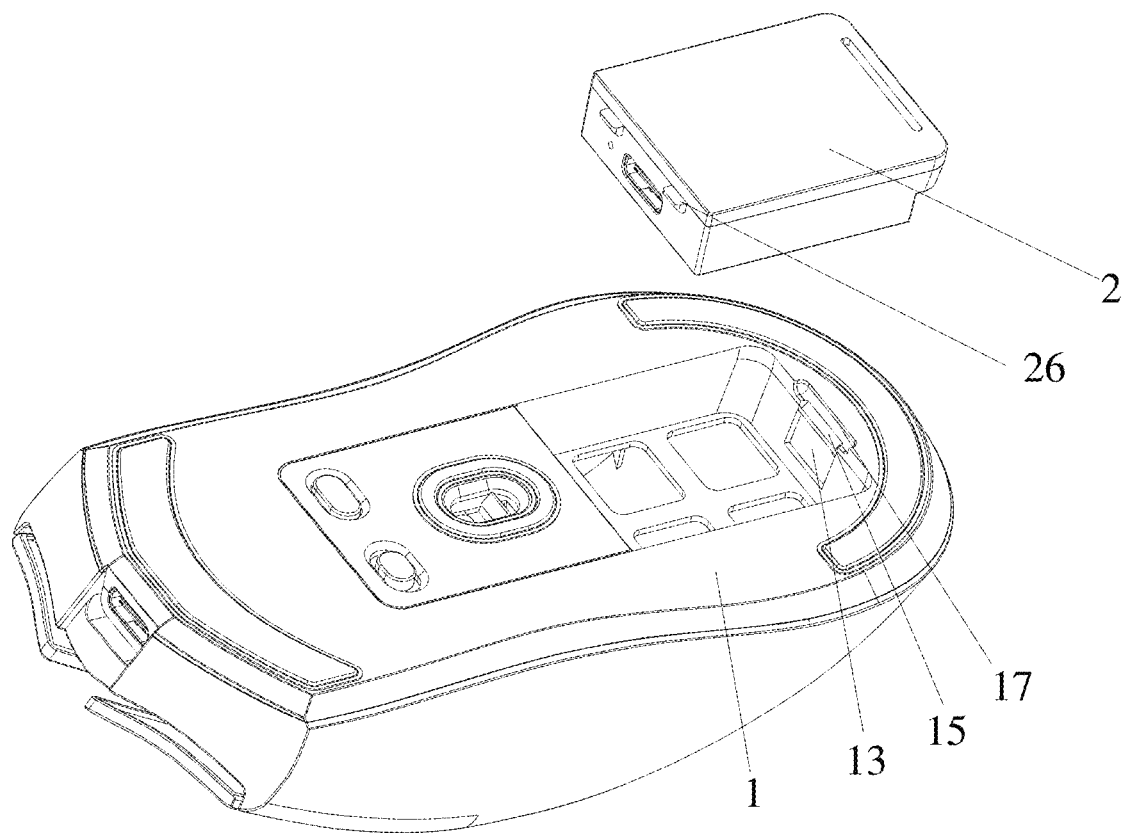
FIG. 3 is a second perspective exploded view of embodiment 1 of the application.

See FIGS. 1-3, in the embodiment 1, the first clamping part 24 is provided on one side of the battery assembly 2, the first clamping groove 13 is provided on one side of the mounting groove 11, and the first clamping part 24 is detachably clamped with the first clamping groove 13.

In the embodiment, one side of the battery assembly 2 is provided with a deformation groove 25, the left and right ends of the first clamping part 24 are respectively fixed to the left and right sides of the deformation groove 25, and a deformation gap 251 for deformation of the first clamping part 24 is formed between the first clamping part 24 and the deformation groove 25.

In the embodiment, the other end of the battery assembly 2 is provided with a second clamping part 26, the other side of the mounting groove 11 is provided with a second clamping groove 14, and the second clamping part 26 is detachably clamped into the second clamping groove 11.

Specifically, the number of the second clamping parts 26 is two, the number of the second clamping grooves 14 is also two, and the two second clamping parts 26 are respectively detachably clamped into the second clamping grooves 14.

In the embodiment, the lower side of the first clamping part 24 is provided with a first guide slope 241, and one side of the mounting groove 11 is provided with a second guide slope 15, wherein the second guide slope 15 is located above the first clamping groove 14.

In the embodiment, a first avoiding groove 242 for facilitating the removal of the battery assembly 2 is provided on the side surface of the first clamping part 24, a second avoiding groove 17 for facilitating the removal of the battery assembly is provided above one side of the mounting groove 11, and the first avoiding groove 242 corresponds to the position of the second avoiding groove 17.

Figure 4:
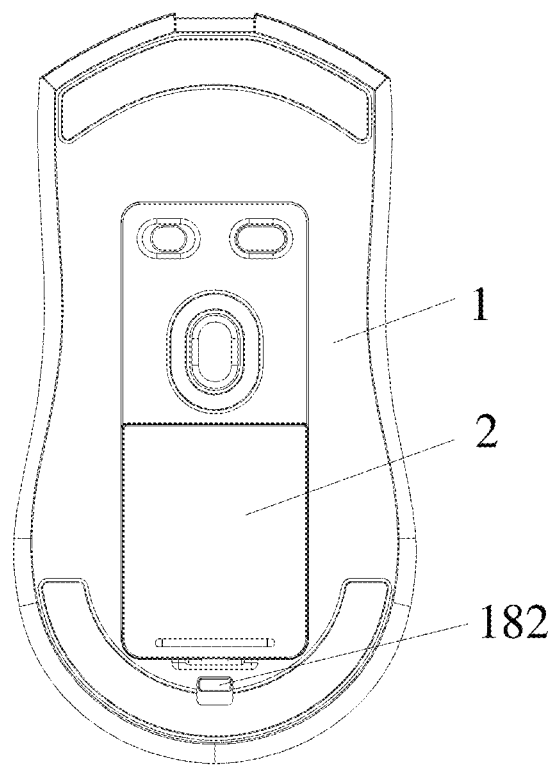
FIG. 4 is a schematic structural diagram of embodiment 2 of the application.
Figure 5:
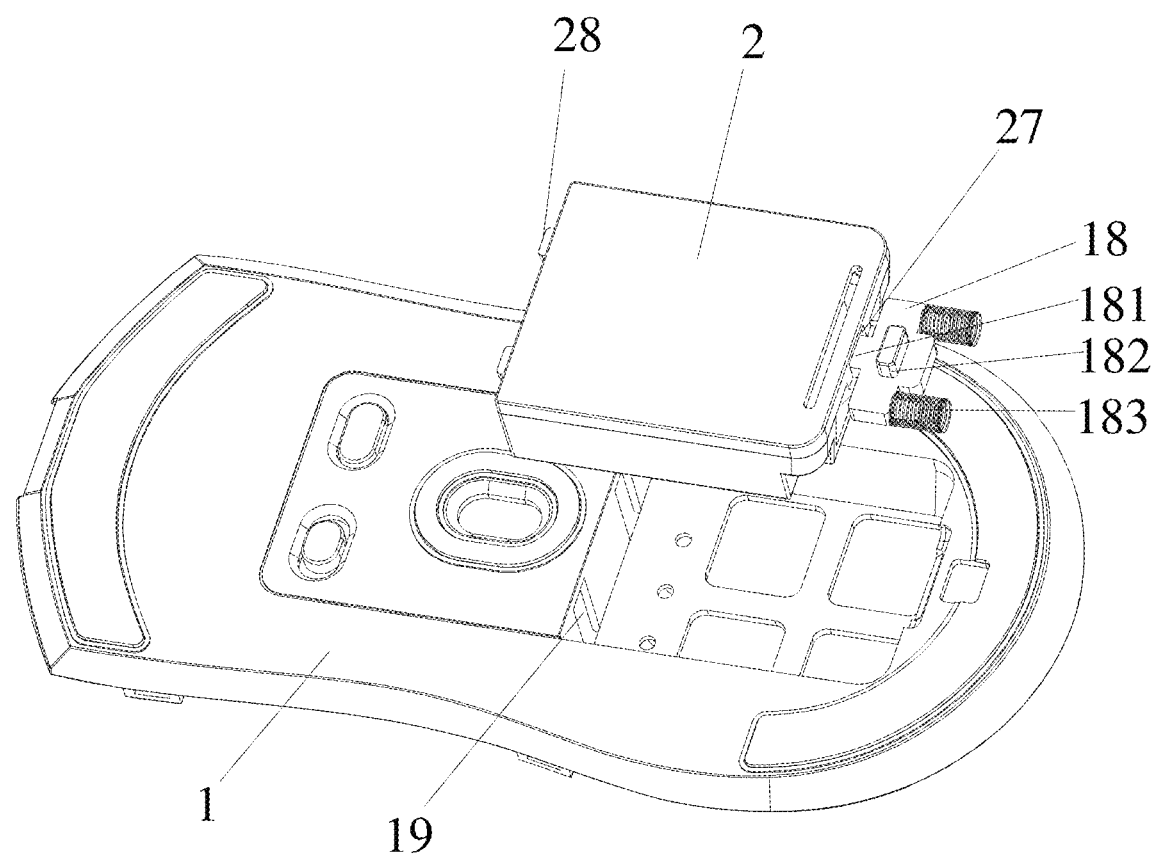
FIG. 5 is an exploded view of a hidden part of the mouse body in embodiment 2 of the application.
Figure 6:
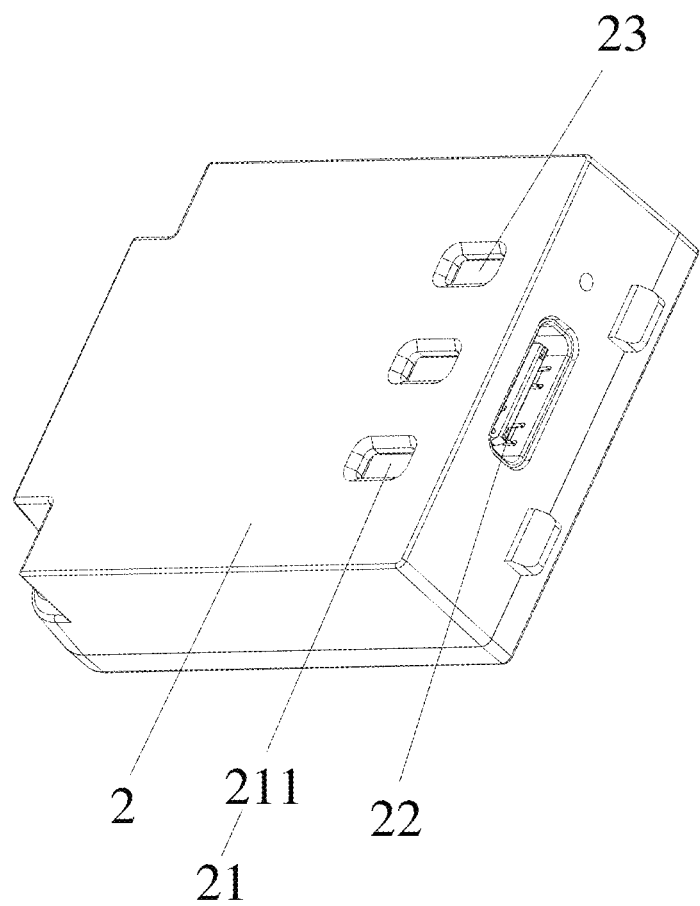
FIG. 6 is a schematic structural diagram of a battery assembly.
Figure 7:
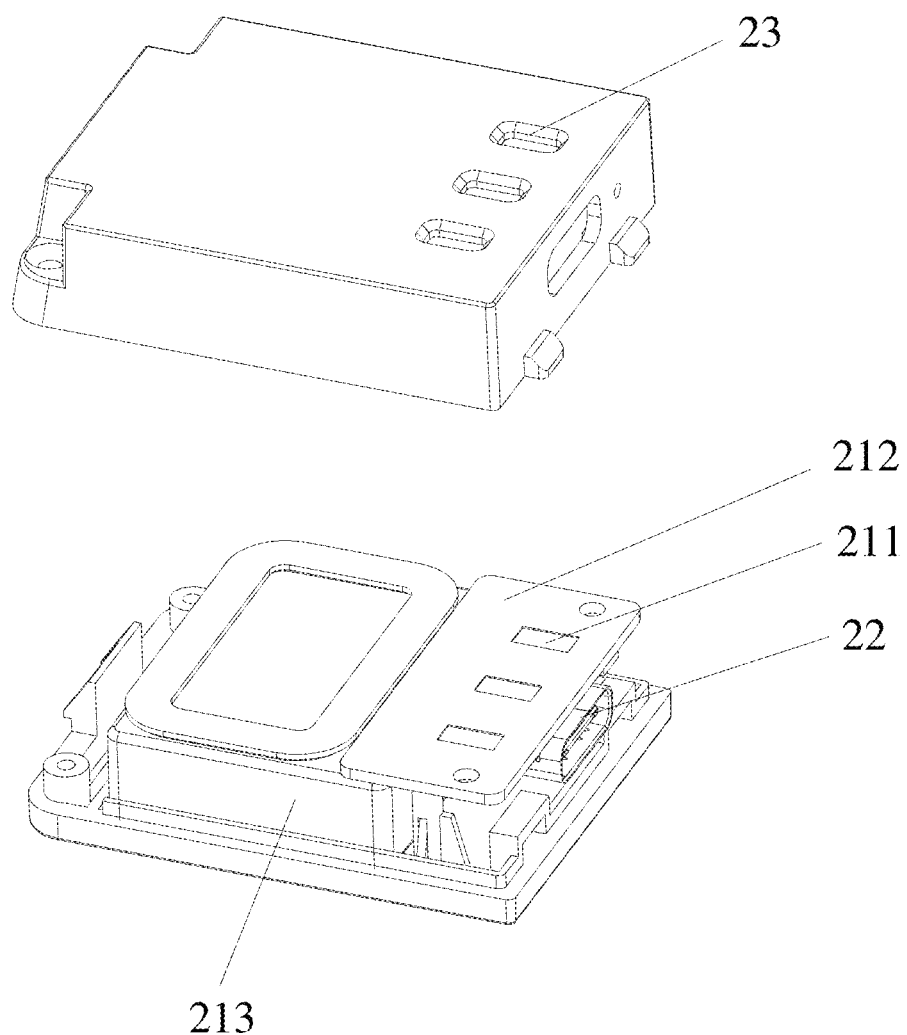
FIG. 7 is an exploded view of the battery assembly.

See FIGS. 4-6, in the embodiment 2, the mounting groove 11 is provided at one side with a first clamping part 181, a first clamping groove 27 is provided on one side of the battery assembly 2, and the first clamping part 181 is detachably clamped with the first clamping groove 27.

In the embodiment, a clamping piece 18 is movably provided in the mouse body 1, a push-pull part 182 is formed at the lower end of the clamping piece 18 protruding from the lower side of the mouse body 1, a front end of the clamping piece 18 protruding from one side of the mounting groove 11 is formed at the first clamping part 181, and an elastic body 183 is provided between the rear end of the clamping piece 18 and the mouse body 1. The elastic body 183 may be a spring, one end of which is fixed or abutted against a side wall inside the mouse body 1, and the other end of which is fixed or abutted against the rear end of the clamping member 18.

In the embodiment, an elastic ejection structure is provided in the mounting groove 11, and the lower side of the battery assembly 2 abuts against the elastic ejection structure. The elastic ejection structure may be a spring ejection structure that automatically ejects the battery assembly 2 when the first clamping part 181 is disengaged from the first clamping groove 27 by the force of the spring. Wherein, the spring ejection structure is located at a position close to the first clamping part 181 of the mounting groove 11.

In the embodiment, the other end of the battery assembly 2 is provided with a second clamping part 28, the other side of the mounting groove 11 is provided with a second clamping groove 19, and the second clamping part 28 is detachably clamped into the second clamping groove 19.

The above are only preferred embodiments of the application, and are not intended to limit the application. Any modification, equivalent replacement or improvement made within the spirit and principle of the application should be included in the protection scope of the application.

The invention claimed is:

1. A power supply detachable mouse, the mouse comprising a mouse body and a battery assembly for supplying power to the mouse body, a mounting groove being provided on a lower side of the mouse body, a first connection end being provided in the mounting groove, a second connection end being provided on the battery assembly, and a charging socket for charging the battery assembly being provided on the battery assembly, characterized in that the battery assembly is detachably clamped in the mounting groove, and the second connection end is electrically connected to the first connection end;

one side of the battery assembly is provided with a first clamping part, one side of the mounting groove is provided with a first clamping groove, and the first clamping part is detachably clamped with the first clamping groove; alternatively, one side of the mounting groove is provided with a first clamping part, one side of the battery assembly is provided with a first clamping groove, and the first clamping part is detachably clamped with the first clamping groove.

2. The power supply detachable mouse according to claim 1, characterized in that the first connection end comprises a plurality of spring probes, the second connection end comprises a plurality of contacts, and the plurality of contacts respectively abut the plurality of spring probes.

3. The power supply detachable mouse according to claim 2, characterized in that the plurality of spring probes are provided on the lower side of the mounting groove, the contacts are fixedly provided inside the battery assembly, and the lower side of the battery assembly is provided with a plurality of connection holes, the plurality of contacts are exposed to the outside through the plurality of connection holes, respectively, and the plurality of spring probes pass through the plurality of connection holes to abut the corresponding contacts, respectively.

4. The power supply detachable mouse according to claim 1, characterized in that one side of the battery assembly is provided with a deformation groove, two ends of the first clamping part are respectively fixed to two sides of the deformation groove, and a deformation gap for deformation of the first clamping part is formed between the first clamping part and the deformation groove.

5. The power supply detachable mouse according to claim 1, characterized in that a first avoiding groove for facilitating removal of the battery assembly is provided on a side surface of the first clamping part, a second avoiding groove for facilitating removal of the battery assembly is provided above one side of the mounting groove, and the first avoiding groove corresponds to the position of the second avoiding groove.

6. The power supply detachable mouse according to claim 1, characterized in that a clamping piece is movably provided in the mouse body, a push-pull part is formed at a lower end of the clamping piece protruding from the lower side of the mouse body, a front end of the clamping piece protruding from one side of the mounting groove is formed at the first clamping part, and an elastic body is provided between the rear end of the clamping piece and the mouse body.

7. The power supply detachable mouse according to claim 6, characterized in that an elastic ejection structure is provided in the mounting groove, and the lower side of the battery assembly abuts on the elastic ejection structure.

8. The power supply detachable mouse according to claim 1, characterized in that the other end of the battery assembly is provided with a second clamping part, the other side of the mounting groove is provided with a second clamping groove, and the second clamping part is detachably clamped into the second clamping groove.

9. The power supply detachable mouse according to claim 4, characterized in that the other end of the battery assembly is provided with a second clamping part, the other side of the mounting groove is provided with a second clamping groove, and the second clamping part is detachably clamped into the second clamping groove.

10. The power supply detachable mouse according to claim 5, characterized in that the other end of the battery assembly is provided with a second clamping part, the other side of the mounting groove is provided with a second clamping groove, and the second clamping part is detachably clamped into the second clamping groove.

11. The power supply detachable mouse according to claim 6, characterized in that the other end of the battery assembly is provided with a second clamping part, the other side of the mounting groove is provided with a second clamping groove, and the second clamping part is detachably clamped into the second clamping groove.

12. The power supply detachable mouse according to claim 7, characterized in that the other end of the battery assembly is provided with a second clamping part, the other side of the mounting groove is provided with a second clamping groove, and the second clamping part is detachably clamped into the second clamping groove.

* * * * *